United States Patent
Ohmura et al.

(10) Patent No.: US 6,692,869 B1
(45) Date of Patent: Feb. 17, 2004

(54) SURFACE-TREATED STEEL SHEET FOR BATTERY CASE, METHOD OF PRODUCTION THEREOF, BATTERY CASE FORMED BY THE STEEL SHEET AND BATTERY USING THE CASE

(75) Inventors: Hitoshi Ohmura, Ymaguchi-ken (JP); Tatsuo Tomomori, Ymaguchi-ken (JP); Hideo Ohmura, Ymaguchi-ken (JP); Keiji Yamane, Ymaguchi-ken (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/744,018

(22) PCT Filed: Jul. 22, 1999

(86) PCT No.: PCT/JP99/03907

§ 371 (c)(1),
(2), (4) Date: Apr. 23, 2001

(87) PCT Pub. No.: WO00/05437

PCT Pub. Date: Feb. 3, 2000

(30) Foreign Application Priority Data

Jul. 24, 1998 (JP) ............................. 10-223747

(51) Int. Cl.[7] .............................. C25D 5/10; H01M 2/02
(52) U.S. Cl. ...................... 429/176; 428/681; 148/529
(58) Field of Search ................................. 429/163, 164, 429/168, 169, 176; 29/623.1, 623.5; 428/681; 148/516, 527, 529

(56) References Cited

U.S. PATENT DOCUMENTS 4,505,987 A * 3/1985 Yamada et al. ............. 428/553
6,040,083 A * 3/2000 Hikata et al. ............... 429/169

FOREIGN PATENT DOCUMENTS

JP 58-14461 A * 1/1983
JP 61-68238 A * 4/1986

OTHER PUBLICATIONS

Derwent abstract for JP 61–068238 A (Apr. 8, 1986).*
JPO abstract for JP 58–14461 A (Jan. 27, 1983).*
Abstract, Hirofumi, JP 9306439, "Battery Can Forming Material, Battery Can Forming Method and Battery Can", (1997), Nov.
Abstract, Hirofumi, JP 10092395, "Battery Can Forming Material and Manufacture Therof", (1998), Apr.
Abstract, Hirofumi, JP 705717, "Metallic Material Plate, Negative Terminal Plate made of the Metallic Material Plate, and Manufacture of the Terminal Plate", (1995), Mar.
Abstract, Katsuhei et al., JP 6278245 "Low Luster Black Steel Plate and Manufacture Thereof", (1994), Oct.
Abstract, Osamu, JP 10142743, "Photographic Film Cartridge", (1998), May.
Abstract, Kenji et al., JP 8287885, "Coated Metallic Plate for Alkaline Dry Cell Positive Electrode Can", (1996), Nov.
Abstract, Teiji et al., JP 10012199, "Alkaline Battery", (1998), Jan.

* cited by examiner

*Primary Examiner*—Susy Tsang-Foster
(74) *Attorney, Agent, or Firm*—Browdy and Neimark, P.L.L.C.

(57) ABSTRACT

The objective of the present invention is to produce a surface treated steel sheet for a battery container of which electric contact to the positive electrode active material is improved, a method of surface treatment for a battery container, a battery container and a battery, wherein the surface treated steel sheet has a graphite dispersed nickel plating layer or a graphite dispersed nickel-alloy plating layer formed on the one side to be the inner surface of a battery container, in which nickel-cobalt alloy, nickel-cobalt-iron alloy, nickel-manganese alloy, nickel-phosphorus alloy, nickel-bismuth alloy or the like is preferable as an alloy plating layer, the battery container is manufactured from these surface treated steel sheets by DI forming or DTR forming, and the battery uses this battery container.

17 Claims, No Drawings

SURFACE-TREATED STEEL SHEET FOR BATTERY CASE, METHOD OF PRODUCTION THEREOF, BATTERY CASE FORMED BY THE STEEL SHEET AND BATTERY USING THE CASE

The present application is the national stage under 35 U.S.C. 371 of PCT/JP99/03907, filed July 22, 1999.

INDUSTRIAL FIELD

The present invention relates to a surface treated steel sheet for a battery container, a method of producing a surface treated steel sheet for a battery container, a battery container and a battery using the steel sheet.

BACKGROUND OF THE INVENTION

With the increase of the demand for alkaline manganese batteries used for small-sized domestic electric devices such as shavers, the demand for the improved performance of these batteries has been increased. Above all, the conductivity of electrons between the inner surface of a battery container which is the positive electrode and the positive electrode active material inserted into a battery should be made excellent so as to achieve the improved battery performance. For that purpose, a lot of proposals are disclosed as follows:

A method of applying a coating having excellent conduction on the inner surface of a container (Laid Open Japanese Patent Sho. 58-48361 and Laid Open Japanese Patent Sho. 59-160959),

- a pre coated steel sheet in which adhesion of the coating is improved (Laid Open Japanese Patent Hei. 6-342653 and Laid Open Japanese Patent Hei. 8-287885),
- as the other methods for improving adhesion of the coating,
- a method of forming concave and convex portions on the inner surface of a container (Laid Open Japanese Patent Sho. 59-209056), and
- a method of causing roughened surface or cracks on the inner surface of a container (Laid Open Japanese Patent Hei. 9-306439).

However, the conventional method of pre coated steel sheet or the like, in which a coating having excellent conduction (conductive coating) is applied on the one side of a steel sheet to become the inner surface of a container, is not favorable because the conductive coating is easily peeled off when the pre coated steel sheet is formed into a battery container, while a method of applying a coating on the inner surface of a container causes the increase of the process which produces an increase in cost.

Considering these problems, the objective of the present invention is to produce an improved surface treated steel sheet having more excellent conductance with the positive electrode active material.

Further, another objective the present invention is to produce a battery container and a battery using the surface treated steel sheet.

DISCLOSURE OF THE INVENTION

The surface treated steel sheet for a battery container is characterized in that a graphite dispersed nickel plating layer is formed on at least one surface of the surface treated steel sheet, that is to become the inner side of a battery container.

The surface treated steel sheet for a battery container is characterized in that a graphite dispersed nickel alloy plating layer is formed on at least one surface of the surface treated steel sheet, that is to become the inner side of a battery container.

In these surface treated steel sheets it is preferable that the alloy plating layer be any layer of nickel-cobalt alloy, nickel-cobalt-iron alloy, nickel-manganese alloy, nickel-phosphorus alloy or nickel-bismuth alloy.

In these surface treated steel sheets it is preferable that a diffusion layer be formed under the plating layer.

Further, in these surface treated steel sheets it is preferable that any layer of mat nickel plating, semi-gloss nickel plating, gloss nickel plating, nickel-cobalt alloy, nickel-cobalt-iron alloy, nickel-manganese alloy, nickel-phosphorus alloy or nickel-bismuth alloy be formed under the plating layer.

In these surface treated steel sheet it is preferable that the content of graphite in the plating layer is 0.1 to 25 weight %.

The method according to the present invention is characterized in that a plating layer is formed on at least on one side to become the inner side of a battery container using a plating bath including nickel salt, surface active agent and graphite powder.

The method according to another embodiment of the present invention is characterized in that a plating layer is formed on at least one side to become the inner side of a battery container using a plating bath including one kind or more of metal salt consisting of cobalt salts, iron salts, manganese salts, salts of phosphorus anions and bismuth salts, nickel salts, along with a surface active agent and graphite powder.

The battery container according to another embodiment of the present invention is characterized in that it is produced from the above-mentioned surface treated steel sheet.

The battery according to the present invention is characterized in that it uses the battery container produced from any surface treated steel sheet produced as described in the present specification.

BEST MODE FOR CARRYING OUT THE INVENTION

The present invention will be described in detail below.

[Steel Sheet Used]

A cold-rolled steel sheet based on a plain steel, particularly based on a continuously casted low carbon aluminum killed steel is used as a steel sheet for the present invention. In addition, a hyper low carbon steel having 0.003 wt % or less of carbon content, an anti aging steel that is the hyper low carbon steel including metals such as niobium, titanium and so on, or a stainless steel sheet including 3 to 18 wt % of chromium content is also available.

[Substratum Nickel Plating]

In the surface treated steel sheet for a battery container, it is preferable that a layer of nickel plating be formed on a steel sheet. Hereinafter, the nickel plating is described as substratum nickel plating. The objective of the formation of the substratum nickel plating layer is to produce enough corrosion resistance even after the plated steel sheet is formed into a battery container to prevent corrosion of the steel sheet.

As a plating bath for the substratum nickel plating, the bath used in the usual nickel plating such as watts bath, sulfamate bath, borofluoride bath or chloride bath can be applied to the present invention. There are 2 types of nickel plating, electrolytical plating and electroless plating. While electroless plating is available, in general electrolytical plating is easier since the bath composition and the plating thickness can be controlled. The current density of 3 to 80 A/dm$^2$ is applied in electrolytical plating and it is preferable to stir the bath by air bubbling for forming a plating layer having a uniform thickness. Furthermore, pH of the bath is preferably in the range of 3.5 to 5.5, and the bath temperature is preferably in the range of 40 to 60° C.

In the present invention, as a substratum nickel plating, any type of mat plating without the use of organic additives, semi-gloss plating or gloss plating using organic additives can be applied. The quantity of the substratum nickel plating layer is preferably 0.5 to 5 μm. The quantity of less than 0.5 μm produces insufficient covering of the steel sheet, which can not cause enough corrosion resistance that is the objective of the substratum nickel plating, while a layer of more than 5 μm saturates the covering effect as well as causing unfavorable economical effect. It is preferable to form the substratum nickel plating on both surfaces of a steel sheet in view of securing corrosion resistance. It is preferable to form the plating having a thickness of about 1 to 3 μm on the one surface to become the inner surface of a container, while it is preferable to form the plating having a thickness of about 1 to 4 μm on the other surface to become the outer surface of a container. It is preferable that the plating thickness on the surface to become the outer surface of a container is a little greater than that on the surface to become the inner surface of a container in view of preventing rust occurrence of a battery container.

Further, as the other substratum plating, for example nickel-cobalt plating, nickel-cobalt-iron plating, nickel-manganese plating, nickel-phosphorus plating or nickel-bismuth plating based on alloy plating bath comprising nickel and any of cobalt, manganese, iron, phosphorus or bismuth can also be available. As a plating bath, known sulfate bath, sulfamate bath or the like can be used. The thickness of the plating might be in the same range as that of the substratum nickel plating.

[Formation of Diffusion Layer]

While the substratum nickel plating layer may be the one as plated, it is preferable to transform the nickel plating layer entirely or partially into a diffusion layer by a heat treatment after plating. The formation of the diffusion layer prevents peeling-off of the nickel plating layer from a steel substrate.

The heat treatment is preferably carried out in an anti-oxidation atmosphere or in a reducing protective atmosphere to prevent the formation of a oxidized film on the surface of the diffusion layer. As an anti-oxidation atmosphere, a so-called inert gas such as nitrogen, argon or helium is preferably used, while as a reducing gas hydrogen or ammonia cracking gas (75% of hydrogen and 25% of nitrogen) is preferably used. As a method for the heat treatment, any of a box annealing or a continuous annealing is available. In case of the box annealing, the temperature for the heat treatment is preferably 450° C. or more. The duration for the heat treatment is shorter in the continuous annealing, while it is rather longer in the box annealing. Generally, it is preferably 30 seconds to 2 minutes for the continuous annealing and 6 to 15 hours for the box annealing.

[Formation of Graphite Dispersed Nickel (Alloy) Plating Layer]

This graphite dispersed nickel plating layer is formed on a side corresponding to the inner surface of a battery container. As a plating bath, one based on a nickel plating bath in which graphite is dispersed (thereby a graphite dispersed nickel plating layer is formed) or another one based on alloy plating bath comprising a metal excluding nickel, such as cobalt, manganese, iron, a salt of a phosphorus compound or bismuth, and nickel in which graphite is dispersed (thereby a graphite dispersed nickel alloy plating layer is formed) is used. However, as metals such as molybdenum, antimony, arsenic, chromium or the like and semi metals have possibility to generate gas in the battery or to drop the voltage, it is preferable to avoid the use of a bath containing these metals or semi metals. The use of a plating bath in which graphite having excellent conductance is dispersed causes the improvement in the collecting ability of electricity of the plating layer with the positive electrode active material by dispersedly codepositing graphite in the plating layer accompanied with formation of the plating layer and by exposedly scattering graphite on the plating layer. In contrast to the surface of the steel sheet/nickel plating layer which is conventionally used, the surface of the nickel plating layer/graphite dispersed nickel layer of the present invention has a greater number of concave and convex portions and a greater surface area, which causes a small contact resistance. Further, in contrast to the conventional combination of steel sheet/nickel plating layer/graphite layer, the combination of steel sheet/nickel plating layer/graphite dispersed nickel plating layer/graphite layer of the present invention has a smaller resistance. It is also affected by the smaller resistance at the interface of graphite dispersed nickel plating layer/graphite layer of the present invention in contrast to the interface of nickel plating layer and graphite layer.

While either natural graphite or synthetic graphite is available for the present invention, finely crushed graphite having 50% cumulative diameter of 10 μm or less is favorably used. Further, graphite having 50% cumulative diameter of 5 μm or less is more favorably used, because the use of graphite having too large a particle diameter compared with the plating thickness causes easy peeling-off of the adhered graphite.

Further, it is also favorable to use graphitized carbon black. Graphitized carbon black is carbon black which is graphitized and has an extremely fine particle diameter of about 0.1 μm or less.

Since graphite has a hydrophobic surface, it is hard to disperse graphite in the plating bath by mere stirring. Therefore, the graphite is forcedly dispersed using a surface active agent dispersing agent of graphite). While any type of surfactant, including cationic, anionic, nonionic or amphoteric can be used as the dispersing agent of graphite, in order to obtain excellent adhesion of the plating layer to the steel sheet and to prevent embrittlement of the plating layer, it is preferable to use an anionic surface active agent as the dispersing agent of graphite for the present invention. Of anionic surface active agents, surfactants based on benzene sulfonic acids or sulfate esters, for example, sodium alkyl sulfate, sodium dodecyl benzene sulfonate, sodium α olefin sulfonate, sodium alkyl naphthalene sulfonate, sodium 2 dialkyl sulfosuccinate or the like are more favorable as the dispersing agent of graphite for the present invention.

Dispersing of the fine graphite into the plating bath is carried out as follows: Namely, the graphite powder is mixed with the dispersing agent of graphite diluted with a certain amount of water, then finally dispersed using an emulsifying mixer such as homogenizer or ultrasonic cleaner. In this case, it is effective for dispersing to moisten the graphite powder with a small amount of alcohol or the like. Thus, after being fully dispersed, the graphite is added into the plating bath under stirring. The blending amount of dispersing agent to graphite is preferably 0.5 to 10 wt %. The content of graphite in the plating bath is preferably controlled as 1 to 100 g/L at the end. While the content of less than 1 g/L causes to small graphite content in the plating, which produces insufficient improvement in conductance between the inner surface of a battery container and positive electrode active agent, the content of more than 100 g/L causes poor fluidity of the plating solution or adhesion of graphite powder around the plating apparatus, which is apt to cause some troubles. Further, 2 to 10 ml/L of dispersing agent is previously added into the plating solution for preventing aggregation of graphite particles.

After dispersing graphite powder in the plating solution, it is preferable that the graphite is always being dispersed in the plating bath by both methods, of which one is to circulate the plating solution to the bottom portion of the electrolysis tank using a circulation pump, and another is to stir the plating solution by blowing air through the micro holes perforated at the bottom portion of the electrolysis tank. Under the favorable dispersion, graphite can be scattered in the plating layer at the content of 0.1 to 25%. Above all, it is favorable to be scattered at the content of 1 to 10%. Incidentally, it is favorable to use the lower current density for graphite dispersed plating layer having greater amount of graphite content.

[Formation of Battery Container]

A battery container is preferably formed by drawing and ironing forming, that is so-called DI forming (drawing and ironing) or DTR forming (drawing thin and redraw). In case of DI forming, a shallow drawn cup made of a surface treated thin steel sheet having slightly larger diameter than that of a battery container is firstly prepared. After that, the cup is provided to multi step ironing dies which are coaxially installed in the manner that the ironing diameter of them becomes smaller one by one, and of which final step ironing die has the ironing diameter corresponding to the outer diameter of the battery container, then it is successively passed through the ironing dies taking care not to cause a waist by pressing using a punch of which the head has rounded shoulder.

In case of DTR forming, a shallow drawn cup is firstly prepared as in case of DI forming, then successively redrawn into a redrawn cup having smaller diameter and taller height than those of the first shallow cup. Namely, in the redrawing, the redrawn cup is held by a nest ring inserted into the redrawn cup and a redrawing die provided under the redrawn cup, a redrawing punch is coaxially installed so as to shuttle in the nest ring, and redrawing dies having varied drawing diameter are successively used. In case of further necessity, the battery container may be formed by the other forming method.

[Production of Alkaline Manganese Battery]

The positive electrode mix is produced by mixing manganese dioxide, carbon and alkaline water solution. It is preferable to use electrolytical manganese dioxide of high purity as manganese dioxide.

The characteristics required for the graphite powder are high purity, chemical steadiness, and excellency in conductance, formability into mix and storage ability of elecrtrolyte. As an example of graphite powder having the above-mentioned required characteristics, acetylene black, several kinds of denatured carbon black such as graphitized carbon black or synthetic graphite powder are listed.

The positive electrode mix is produced by mixing electrolytical manganese dioxide and graphite powder at the preferable weight ratio of 20/1 to 10/1, further adding potassium hydroxide water solution and mixing by some suitable method.

Further, in case of necessity, it is also preferable for excellent conductance between the battery container and the positive electrode mix, for example, to coat a mixture comprising graphite powder, thermosetting resin and organic solvent such as methyl ethyl ketone on the inner surface of a battery container using spraying and so on, and dry it.

Next, the afore-mentioned mix is pressed in a mold to form a prescribed doughnut shaped mix pellets, and then the mix pellets are inserted and pressed to the inside of the battery container. Further, the prescribed portion under the open edge portion of the battery container is previously processed by neck-in forming for mounting the negative electrode board on which the negative electrode collector rod is spot welded to the battery container.

The separator used in a battery, of which the objective is to prevent the mutual migration of the particles of the negative electrode active material and the positive electrode active material and separate the reaction product formed at the negative electrode from the positive electrode by itself so as to prevent short circuit and self discharge in the battery, is made of an alkali resistant fibrous material or unwoven cloth. For instance, synthetic resin material such as vinylon, polyolefin, polyamide or the like, linter pulp having 98% or more of α cellulose content, mercerized wood pulp, regenerated cellulose or the like can be used.

These fibrous separators are inserted in the battery container along the inner circumference of the positive electrode mix pellets pressed to the battery container, and then the negative electrode gel comprising potassium hydroxide water solution in which zinc particle and zinc dioxide are dissolved is inserted in the battery container. In this case, atomized zinc particle having a center diameter of around 200 $\mu$m is preferably used. Moreover, starch, cellulose derivative, polyacrylate or the like can be used as a gelling material.

After this is inserted into the battery container, a gasket of insulating material is mounted on the negative electrode board, and then a lid is caulked. Thus, an alkaline manganese battery is completed.

EMBODIMENTS

Embodiments according to the present invention will be described in detail below.

EXAMPLE 1

A hot rolled steel sheet having a chemical composition of C:0.03 wt %, Mn:0.20 wt %, Si:0.01 wt %, P:0.011 wt %, S:0.06 wt %, Al:0.035 wt % and N:0.025 wt % was cold rolled, annealed and then skin-passed so as to make a plating substrate having thickness of 0.4 mm. The plating substrate was degreased in alkali solution using NaOH water solution (30 g/L) at 75° C. by anodic treatment (5 A/dm$^2$×10 seconds) and cathodic treatment (5 A/dm$^1$×10 seconds). Then, it was dipped into sulfuric acid water solution (50 g/L) for about 15 seconds for pickling. After that, the substratum nickel plating layer was formed on the plating substrate using watts bath and air stirring under the following conditions. As the anode, a titanium basket provided with a polypropylene bag containing nickel pellets was used. Plating duration was controlled such that the plating thickness on the surface to become inner surface of a battery container was 2.0 $\mu$m and that on the surface to become inner surface of a battery container was 1.9 $\mu$m, respectively.

[Conditions for Substratum Nickel Plating]

| [Bath composition] | |
|---|---|
| Nickel sulfate | 300 g/L |
| Nickel chloride | 45 g/L |
| Boric acid | 45 g/L |
| [Plating conditions] | |
| Bath temperature | 55 ∀ 2° C. |
| pH | 4.2 ∀ 0.2 |
| Current density | 20 A/dm$^2$ |

The steel sheet finished by the substratum nickel plating was heat diffusion treatment at 550° C. for 8 hours in the atmosphere of nitrogen: 94% and hydrogen 6%. The thickness of the nickel-iron diffusion layer was confirmed as 2.6 $\mu$M by a glow discharge emission spectroscopy.

[Skin Pass Rolling]

After the heat diffusion treatment, the steel sheet was skin pass rolled for preventing the occurrence of stretcher strain.

[Graphite Dispersing Nickel Plating]

After that, the graphite dispersing nickel plating was carried out using a graphite dispersing nickel plating bath under the following conditions. The air stirring was also carried out in this graphite dispersing nickel plating. The condition about the anode was corresponding to that aforementioned in the substratum nickel plating. In this graphite dispersing nickel plating, the plating thickness and the graphite content in the plating layer were varied by varying the plating duration and the graphite content in the plating bath.

[Conditions for Graphite Dispersing Nickel Plating]

| [Bath composition] | |
|---|---|
| Nickel sulfate | 300 g/L |
| Nickel chloride | 45 g/L |
| Boric acid | 45 g/L |
| Graphite | 1 g/L |
| Dispersing agent | 5 ml/L |
| [Plating conditions] | |
| Bath temperature | 60 ± 2° C. |
| pH | 4.3 ± 0.2 |
| Current density | 15 A/dm$^2$ |

[Preparing Method of Graphite Dispersing Nickel Plating Bath]

The graphite was dispersed in the plating solution as mentioned below. At first, 4 ml of sodium benzene sulfonate (graphite dispersing agent) on sale was diluted with 1 L of demineralized water, and 1 kg of fine particle graphite was mixed into the diluted solution (mixed solution). After that, further 1 L of demineralized water was added for improving fluidity of the mixed solution, and then the solution was fully stirred and mixed using an ultrasonic dispersing device. Thus, the diluted mixed solution was prepared. The graphite dispersing nickel plating bath was prepared by adding the diluted mixed solution into the abovementioned plating solution and stirring. As fine particle graphite, graphite powder ASSP (50% cumulative diameter of 6 $\mu$m) manufactured by NIHON KOKUEN KOGYO Inc. was used.

[Formation of Battery Container]

Next, a battery container was formed by DI forming method using this plated steel sheet. After forming a cup having a diameter of 20.5 mm, the cup was formed into a container having an outer diameter of 13.8 mm, a wall thickness of 0.20 mm and a height of 56 mm by redrawing and 2 step ironing using DI forming machine. After that, the upper portion of the container was trimmed off and thus a container for LR-6 type battery having a height of 49.3 mm was obtained at the end. The magnifying observation of the inner surface of the container by an electron microscope confirmed that the graphite was scatteringly adhered as spots. Further, the graphite content in the plating layer was measured by an infrared absorption method (JIS G 1211).

The examination of the relation between the quantity of graphite added in the plating solution and the content of graphite in the plating layer showed that they were almost in direct proportion. Namely, when the quantity of graphite added in the plating bath was 5 to 100 g/L, the content of graphite on the surface treated steel sheet was measured as 1 to 25%.

Incidentally, when the up to 10 ml/L of dispersing agent was added into the plating solution, the added quantity of it was in direct proportion to the graphite content. When more than 10 ml/L, the graphite content saturates.

[Formation of Battery]

A battery was manufactured in the following manner by filling the positive electrode active material into this battery container. Then, the battery performance of it was measured.

At first, Manganese dioxide and graphite were gathered at the weight ratio of 10:1. After that, potassium hydroxide of 8 mole was added to them and mixed, which produced the positive electrode mix. On the other hand, the mixture comprising 80 weight part of graphite and 20 weight part of epoxy resin was diluted by methylethyl ketone. Then, the diluted solution was air-sprayed onto the inner surface of the battery container followed by heating at 150° C. for 15 minutes for drying. The afore-mentioned positive electrode mix was pressed in a mold to be shaped into doughnut shaped pellets of mix, which were inserted into the battery container and pressure-bonded to it. The prescribed portion under the open edge of the battery container was formed by neck-in forming for the purpose that a negative electrode board to which a negative electrode collecting rod was spot-welded was provided to the battery container.

Next, a separator made of unwoven cloth of vinylon was inserted along the inner circumference of pellets pressure-bonded to the battery container, and then negative electrode gel comprising dissolved zinc granules and zinc oxide in potassium hydroxide was inserted into the battery container. After that, an insulating gasket which was fit to the negative electrode board was inserted into the battery container, and further caulked. Thus, an alkaline-manganese battery was completed.

After the thus manufactured alkaline-manganese battery was placed at 60° C. for 20 days, internal resistance, short-circuit current and continuous discharge duration until the voltage dropped to 0.9 V in case of being connected to an outer resistance of 2 Ω were measured. The results were shown in Table 1.

EXAMPLE 2 To 6

Several kinds of surface treated steel sheets were prepared varying the thickness of the substratum nickel plating layer, the thickness of graphite dispersed nickel plating layer, the quantity of dispersing agent and the content of graphite under the same conditions as those of EXAMPLE 1.

Battery containers were press-formed using these surface treated steel sheets, batteries were manufactured, and then, the battery performance of them was measured in the same manner as in Example 1. The results were collectively shown in Table 1.

EXAMPLE 7

A hyper-low carbon cold rolled steel sheet having thickness of 0.4 mm and the following chemical composition which was used as a substrate for plating was degreased, pickled and then covered with substratum nickel plating.

<Chemical Composition>

C:0.003 wt %, Mn:0.19 wt %, Si:0.01 wt %, P:0.011 wt %, S:0.06 wt %, Al:0.035 wt %, N:0.0021 wt % and Nb:0.002 wt %.

After being covered with substratum nickel plating, the steel sheet was simultaneously heat treated for recrystallization annealing and for heat diffusion of nickel plating layer in a continuous annealing furnace. The annealing condition was heating at 780° C. for 1 minute in the same atmosphere as that of Example 1. The thickness of iron-nickel diffusion layer confirmed by a glow discharge emission spectroscopy was 2.8 μm. After being annealed and skin pass rolled, the steel sheet was plated by graphite dispersed nickel-cobalt-iron alloy plating under the following conditions. The plating solution was also air-stirred. The condition of the anode was the same as that for the substratum nickel plating. The dispersing method of graphite was the same as that of Example 1.

| [Bath composition] | |
|---|---|
| Nickel sulfate | 300 g/L |
| Nickel chloride | 45 g/L |
| Boric acid | 45 g/L |
| Cobalt sulfate | 5 g/L |
| Ferric sulfate | 5 g/L |
| Graphite | 30 g/L |
| Dispersing agent | 5 ml/L |
| [Plating conditions] | |
| Bath temperature | 60 ± 2° C. |
| pH | 4.3 ± 0.2 |
| Current density | 15 A/dm$^2$ |

This graphite dispersed alloy plating produced a graphite dispersed nickel alloy plating containing 2.3% of cobalt, 1% of iron and 7% of graphite.

Then, a battery containers was press-formed using this surface treated steel sheet, a battery were manufactured, and then, the battery performance of it was measured in the same manner as in Example 1. The result was shown in Table 1.

EXAMPLE 8

A steel sheet having thickness of 0.4 mm was used as a substrate for plating, which was degreased, pickled and then covered with substratum nickel plating.

After being covered with substratum nickel plating, the steel sheet was heat treated for heat diffusion under the same conditions as those of Example 1. After being skin pass rolled, the steel sheet was plated by graphite dispersed nickel-manganese alloy plating under the following conditions. The plating solution was also air-stirred. The condition of the anode was the same as that for the substratum nickel plating. The dispersing method of graphite was the same as that of Example 1.

| [Bath composition] | |
|---|---|
| Nickel sulfamate | 280 g/L |
| Nickel chloride | 5 g/L |
| Boric acid | 33 g/L |
| Manganese sulfate | 15 g/L |
| Graphite | 40 g/L |
| Dispersing agent | 10 ml/L |
| Pit less agent | 2.0 ml/L |
| [Plating conditions] | |
| Bath temperature | 60 ± 2° C. |
| pH | 4.0 ± 0.2 |
| Current density | 10 A/dm$^2$ |

This graphite dispersed alloy plating produced a graphite dispersed nickel alloy plating containing 0.7% of manganese and 10% of graphite.

Then, a battery containers was press-formed using this surface treated steel sheet, a battery were manufactured, and then, the battery performance, of it was measured in the same manner as in Example 1. The result was shown in Table 1.

EXAMPLE 9

A steel sheet having thickness of 0.4 mm. was used as a substrate for plating, which was degreased, pickled and then covered with substratum nickel plating.

After being covered with substratum nickel plating, the steel sheet was heat treated for heat diffusion under the same conditions as those of Example 1. After being skin pass rolled, the steel sheet was plated by graphite dispersed nickel-phosphorus alloy plating under the following conditions. The plating solution was also air-stirred. The condition of the anode was the same as that for the substratum nickel plating. The dispersing method of graphite was the same as that of Example 1.

| [Bath composition] | |
|---|---|
| Nickel sulfate | 280 g/L |
| Nickel chloride | 45 g/L |
| Boric acid | 45 g/L |
| Phosphorous acid | 5 g/L |
| Graphite | 15 g/L |
| Dispersing agent | 4 ml/L |
| [Plating conditions] | |
| Bath temperature | 65 ± 2° C. |
| pH | 1.2 ± 0.2 |
| Current density | 15 A/dm$^2$ |

This graphite dispersed alloy plating produced a graphite dispersed nickel alloy plating containing 2% of phosphorus and 3% of graphite.

Then, a battery containers was press-formed using this surface treated steel sheet, a battery were manufactured, and then, the battery performance of it was measured in the same manner as in Example 1. The result was shown in Table 1.

EXAMPLE 10

A steel sheet having thickness of 0.4 mm was used as a substrate for plating, which was degreased, pickled and then covered with substratum nickel plating.

After being covered with substratum nickel plating, the steel sheet was heat treated for heat diffusion under the same conditions as those of Example 1. After being skin pass rolled, the steel sheet was plated by graphite dispersed nickel-bismuth alloy plating under the following conditions.

The plating solution was also air-stirred. The condition of the anode was the same as that for the substratum nickel plating. The dispersing method of graphite was the same as that of Example 1.

[Bath composition]

| | |
|---|---|
| Nickel sulfate | 240 g/L |
| Bismuth sulfate | 1 g/L |
| Disodium ethylenediamine tetra acetate | 20 g/L |
| Dispersing agent | 5 ml/L |
| Graphite | 20 g/L |
| Pit less agent | 2.0 ml/L |
| [Plating conditions] | |
| Bath temperature | 45 ± 2° C. |
| pH | 1.5 |
| Current density | 10 A/dm$^2$ |

This graphite dispersed alloy plating produced a graphite dispersed nickel alloy plating containing 4% of bismuth and 5% of graphite.

EXAMPLE 11

A steel sheet having thickness of 0.4 mm was used as a substrate for plating, which was degreased, pickled and then covered with substratum nickel plating.

As the substratum nickel plating, semi gloss nickel plating was carried out using a plating solution comprising the nickel plating bath used in Example 1 which was added by semi gloss brightener consisting of 3 cc/L of formardehyde unsaturated carboxylic acid and 3 cc/L of polyoxy-ethylene additives. After being covered with the substratum nickel plating, the steel sheet was plated by graphite dispersed nickel plating of which thickness was 2 μm and graphite content was 5% under the same conditions as those of Example 1. The dispersing method of graphite was the same as that of Example 1.

Then, a battery containers was press-formed using this surface treated steel sheet, a battery were manufactured, and then, the battery performance of it was measured in the same manner as in Example 1. The result was shown in Table 1.

EXAMPLE 12

A steel sheet having thickness of 0.4 mm was used as a substrate for plating, which was degreased, pickled and then covered with substratum nickel plating.

Next, as the substratum nickel plating, nickel-1% phosphorus plating was carried out using the following plating bath.

[Bath composition]

| | |
|---|---|
| Nickel sulfate | 280 g/L |
| Nickel chloride | 45 g/L |
| Boric acid | 45 g/L |
| Phosphorous acid | 5 g/L |
| [Plating conditions] | |
| Bath temperature | 65 ± 2° C. |
| pH | 1.2 ± 0.2 |
| Current density | 15 A/dM$^2$ |

After being covered with the nickel-phosphorus plating layer, the steel sheet was plated by graphite dispersed nickel plating under the conditions of Example 11 in which the treating duration alone was changed. Then, a battery container was press-formed using this surface treated steel sheet, a battery was manufactured, and then, the battery performance of it was measured in the same manner as in Example 1. The result was shown in Table 1.

COMPARATIVE EXAMPLE 1

A steel sheet having the same thickness and the same chemical composition as those of Example 1 was used as a substrate for plating, which was degreased, pickled and then covered with substratum nickel plating. After that, the steel sheet was heat treated, skin pass rolled, and then nickel-plated again under the following conditions.

[Bath composition]

| | |
|---|---|
| Nickel sulfate | 300 g/L |
| Nickel chloride | 45 g/L |
| Boric acid | 45 g/L |
| Pit less agent (sodium lauryl sulfate) | 2.0 ml/L |
| [Plating conditions] | |
| Bath temperature | 60 ± 2° C. |
| pH | 4.3 ± 0.2 |
| Current density | 15 A/dM$^2$ |

COMPARATIVE EXAMPLE 2

A steel sheet having the same thickness and the same chemical composition as those of Example 1 was used as a substrate for plating, which was degreased, pickled and then covered with substratum nickel plating. However, further plating was not carried out after that.

The characteristics of the steel sheets and the battery performance of Examples and Comparative examples were measured as follows:

(1) Graphite Content in the Plating Layer

It was measured by an infrared absorption method mentioned in JIS G 1211.

After the carbon content in 1 g of the plated steel sheet was measured, that in the same steel sheet of which plating layer was removed was measured. Then, the difference in them was defined as the graphite content (weight %) in the plating layer.

The 50% cumulative diameter of graphite particle was measured using a laser diffraction type particle size distribution tester.

(2) Thickness of the Diffusion Layer

It was measured by a method using a glow discharge emission spectroscopy.

(3) Internal Resistance

After the manufactured battery was placed at 60° C. for 20 days, the internal resistance (m Ω) was measured by an alternate current impedance method.

(4) Short Circuit Current

After the manufactured battery was placed at 60° C. for 20 days, the current value flown in the closed circuit composed by connecting a ammeter to the battery was measured, and the value was determined as a short circuit current.

(4) Continuous Discharging Duration

After the manufactured battery was stored at 60° C. for 20 days, the duration until the voltage dropped to 0.9 V was measured using a closed circuit composed by connecting a resistance of 2 Ω to the battery. The measured value was shown as an index in the case where the measured value of Comparative example 2 was shown as the index of 100.

POSSIBILITY OF USE IN INDUSTRY

The battery container of the present invention has a graphite dispersed nickel plating layer or a graphite dispersed nickel-alloy plating layer containing graphite on the outermost layer inside the battery container. For this reason, the smaller contacting resistance, the greater short circuit current and the longer continuous discharging duration compared to a nickel layer or nickel-iron alloy layer can be obtained. Thus, the battery using the battery container of the present invention has an improved battery performance since the plating layer of it contains graphite.

What is claimed is:

1. A surface treated steel sheet for a battery container wherein a graphite dispersed nickel plating layer consisting of graphite and nickel is formed on at least one surface of the surface treated steel sheet that is to become the inner side of a battery container, wherein the graphite is selected from the group consisting of natural graphite, synthetic graphite and graphitized carbon black.

2. A battery container produced from any surface treated steel sheet according to claim 1.

3. A battery which uses said battery container according to claim 2.

4. A surface treated steel sheet for a battery container according to claim 1 wherein a diffusion layer is formed under said plating layer.

5. A surface treated steel sheet for a battery container according to claim 1 wherein a layer of mat nickel plating is formed under said plating layer.

6. A surface treated steel sheet for a battery container according to claim 1 in which the content of graphite in said plating layer is 0.1 to 25 weight %.

7. The surface treated steel sheet for a battery container according to claim 5 wherein the layer of mat nickel plating is selected from the group consisting of semi-gloss nickel plating, gloss nickel plating, nickel-cobalt alloy, nickel-cobalt alloy, nickel-cobalt-iron alloy, nickel-manganese alloy, nickel-phosphorus alloy, and nickel-bismuth alloy.

8. The surface treated steel sheet according to claim 1 wherein 50% of the graphite has a cumulative diameter of 10 microns or less.

9. A surface treated steel sheet for a battery container wherein a graphite dispersed nickel alloy plating layer consisting of graphite and a nickel alloy is formed on at least one surface of the surface treated steel sheet that is to become the inner side of a battery container, wherein the graphite is selected from the group consisting of natural graphite, synthetic graphite and graphitized carbon black.

10. A surface treated steel sheet for a battery container according to claim 9 wherein said alloy plating layer is any layer of nickel-cobalt alloy, nickel-cobalt-iron alloy, nickel-manganese alloy, nickel-phosphorus alloy or nickel-bismuth alloy.

11. A surface treated steel sheet for a battery container according to claim 9 in which a diffusion layer is formed under said plating layer.

12. A surface treated steel sheet for a battery container according to claim 9 in which any layer of mat nickel plating, semi-gloss nickel plating, gloss nickel plating, nickel-cobalt alloy, nickel-cobalt-iron alloy, nickel-manganese alloy, nickel-phosphorus alloy or nickel-bismuth alloy is formed under said plating layer.

13. A surface treated steel sheet for a battery container according to claim 9 in which the content of graphite in said plating layer is 0.1 to 25 weight %.

14. A battery container produced from any surface treated steel sheet according to claim 9.

15. The surface treated steel sheet according to claim 9 wherein 50% of the graphite has a cumulative diameter of 10 microns or less.

16. A method of surface treatment for a battery container wherein a plating layer is formed on at least one side to become the inner side of a battery container using a plating bath including nickel salt, surface active agent and graphite powder, and wherein the graphite is selected from the group consisting of natural graphite, synthetic graphite and graphitized carbon black.

17. A method of surface treatment for a battery container wherein a plating layer is formed on at least on one side to become the inner side of a battery container using a plating bath including (a) one or more of the following selected from the group consisting of cobalt salts, iron salts, manganese salts, phosphorus compounds and bismuth salts, nickel salts, (b) surface active agents and (c) graphite powder, wherein the graphite is selected from the group consisting of natural graphite, synthetic graphite and graphitized carbon black.

* * * * *